March 5, 1957  J. E. DUFF  2,783,819
METHOD OF MAKING AN EXTENSIBLE FLEXIBLE HOSE
Filed Oct. 4, 1954  3 Sheets-Sheet 1

March 5, 1957  J. E. DUFF  2,783,819
METHOD OF MAKING AN EXTENSIBLE FLEXIBLE HOSE
Filed Oct. 4, 1954  3 Sheets-Sheet 2
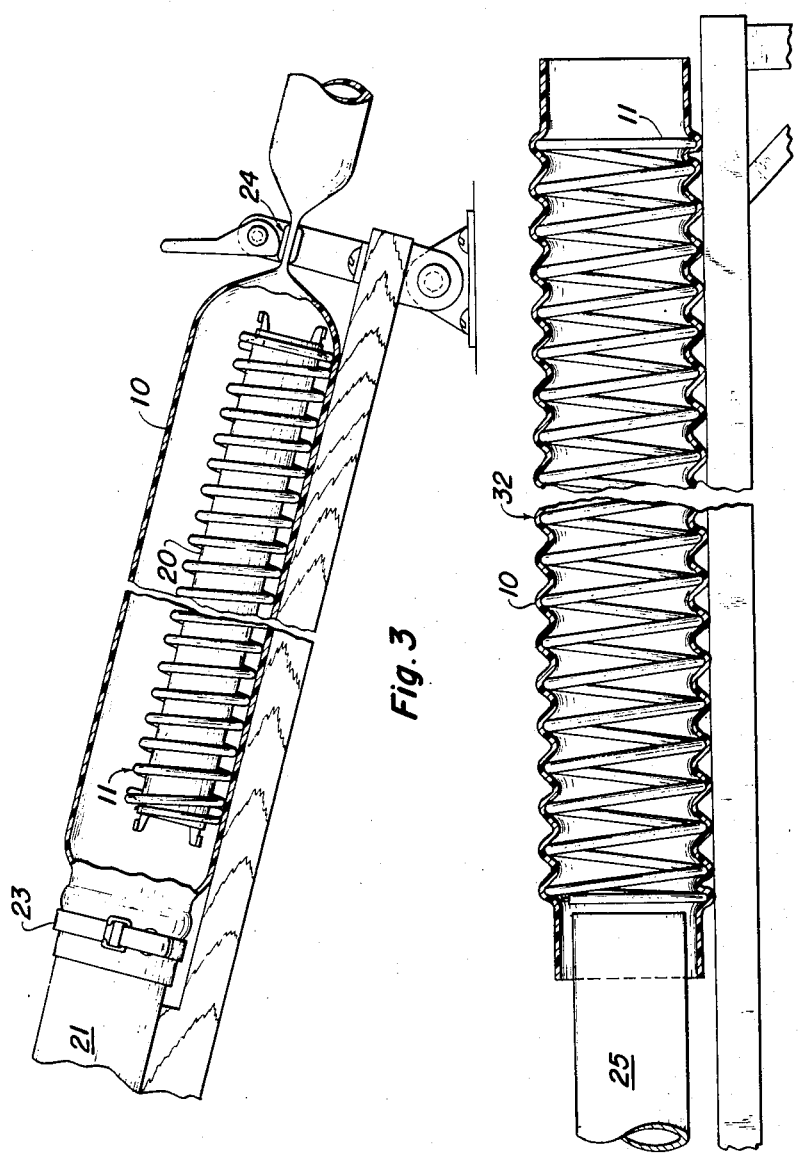

March 5, 1957 J. E. DUFF 2,783,819
METHOD OF MAKING AN EXTENSIBLE FLEXIBLE HOSE
Filed Oct. 4, 1954 3 Sheets-Sheet 3

United States Patent Office 2,783,819
Patented Mar. 5, 1957

2,783,819

METHOD OF MAKING AN EXTENSIBLE FLEXIBLE HOSE

Jack E. Duff, Canton, Ohio, assignor to The Hoover Company, North Canton, Ohio, a corporation of Ohio Application October 4, 1954, Serial No. 459,990

15 Claims. (Cl. 154—8)

This application is a continuation-in-part of my co-pending application Serial No. 415,256 filed March 10, 1954, now Patent No. 2,739,616.

The present invention relates to the method of making a flexible hose and more particularly to a readily extensible flexible hose for use with suction cleaners, either of the so-called tank type or with an upright cleaner for "off-the-floor" cleaning.

According to the present invention, the hose is made of a reinforcing element coiled into a cylindrical spiral and prestressed so that the coils thereof lie in contact with and press against each other, and separated by loops or folds in the wall of a thin thermoplastic tube.

Specifically according to the present invention, a composite reinforcing element is formed of a sheathed or coated reinforcing wire wound into a cylindrical spiral coil so that the convolutions or turns thereof normally press against each other. The thermoplastic tube is applied exteriorly of the cylindrical spirally coiled composite reinforcing element while the latter is in extended position whereby the hose is readily extensible in use.

The composite reinforcing element is thereafter collapsed so as to form a deep spiral fold or loop in the tube wall lying between the closely spaced convolutions of the composite reinforcing element, during or after which the hose is subjected to heat treatment while the tube wall is in its deeply corrugated position. When the tube was originally extruded stresses were set up in its wall tending to shorten the hose lengthwise and to reduce its periphery. The heat applied causes the stress in the tube to be relaxed and when removed from the heat source it takes a permanent set in its collapsed position.

In one modification, the inside diameter of the thermoplastic carcass is less than the outside diameter of the closely wound coated wire coil and is applied to the coiled wire while its coils are in an extended position, at least 2–4 times its original length. The hose carcass thus formed is then placed in a bath of water at a temperature of from 150° to 180° F. for a few seconds. The original inside diameter of the tube being less than that of the coil and due to the stresses present in its wall, it will tend to fold inwardly between the coils of the wire. The coil being stretched it will tend to return to its original length. As heat is applied, the walls of the tube will soften to a semiplastic state and relax the tension thereon. The force exerted by the spring will cause the hose to contract and form a very deep spiral corrugation in the tube wall between the wire convolutions resulting in a very flexible and stretchable flexible hose.

Thus the hose made according to the present invention is ultra-flexible and also extensible since the deep folds in the tube wall need only be straightened out as the hose is flexed or extended without any stretching of the tube wall whatsoever.

The amount the coil is stretched determines the length of tubing which must be used and the depth of the corrugations or folds which will be formed in the finished hose. It therefore will determine the extensibility of the hose and to some extent its flexibility which also depends on other factors which will later appear.

While it is preferable that the coil be prestressed so that its coils press against each other, the coils may be spaced somewhat. The essential feature is that the coil be stretched or extended when the tube is applied so that the turns of the coil tend to move toward each other when free to do so. By thus varying the prestressing of the coil, hose of different flexibilities may be formed.

Other objects and advantages of the present invention will become apparent as the description proceeds when taken in connection with the accompanying drawings in which:

Figs. 2 and 3 show one apparatus by which the tube may be assembled about the exterior of the precoiled composite reinforcing element.

Fig. 4 shows one method by which the tube may be adhered to the composite reinforcing element if that is found desirable.

Figure 1:
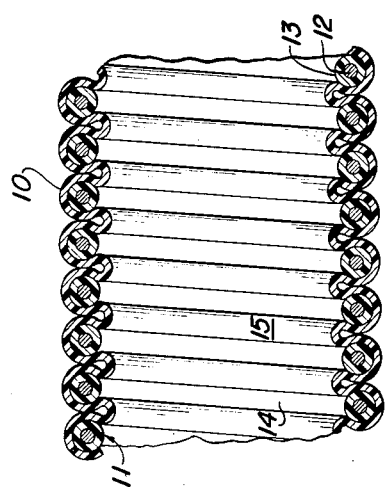
Fig. 1 is a cross-sectional view of a preferred form of the hose of the present invention, with the composite reinforcing element positioned interiorly of the tube.

The hose of Fig. 1 comprises a thermoplastic tube 10 and a composite reinforcing element 11 positioned on the interior of the tube 10. The composite element 11 comprises a reinforcing wire 12 and a sheath or coating 13 of thermoplastic material which may or may not be adhered to the thermoplastic tube 10.

The tube 10 is deeply corrugated and the composite reinforcing element 11, before assembly, contracted or prestressed so that its coils are in substantial contact, being separated only by the corrugated walls of the tube 10.

The tube 10 is formed interiorly, with deep valleys 14 forming a spiral recess in which the element 11 is positioned and with interior hills or folds 15, the walls of which extend between the coils or turns of the composite reinforcing element 11.

The composite reinforcing element 11 is normally stressed to take a collapsed position with its turns or coils pressing against each other if not separated by the folds 15 and thus are easily extensible when the hose is flexed or elongated. The walls of the tube 10 forming the hills or folds 15 will straighten out when the hose is stretched or flexed without interference from the composite reinforcing element 11. The foregoing features render the hose ultra-flexible and easily extensible, both features rendering the hose especially useful with suction cleaners.

The interior hills and valleys are of soft material which will not reflect sound waves so that objectionable whistling noises will not be produced as sometimes happens in other hoses.

In Fig. 1 the interior hills 15 are elongated when the hose is stretched. In collapsed position, the inside diameter of the hose is approximately 1.39 inches, whereas in its fully extended position, its inside diameter will be that of the composite reinforcing element 11, which may be from 1⅜ to 1.54 inches.

The reinforcing wire 12 is preferably made of steel wire 0.058 inch in diameter and the sheath or coating 13 is approximately 0.010 inch in thickness, making the complete diameter of the composite reinforcing element 11, 0.078 inch. The tube 10 is preferably made of polyvinyl chloride having a wall thickness of 0.022 inch and a tensile strength of 2,000 pounds per square inch at 80° F. The sheath 13 is made of the same material as the tube.

The steel wire may be replaced by an aluminum wire of suitable diameter and stiffness. While the above figures are not critical for making hose for other uses, they have been found satisfactory for making hose for use with suction cleaners.

The strength and diameter of the steel wire, the thickness and hardness of the sheath and the thickness and hardness of the tube will all determine to some extent the extensibility and flexibility of the finished hose and may be varied considerably for making hoses of different strengths and flexibility for various uses.

The wire 12 may be tightly coiled with its runs or coils in contact with each other either before or after the sheath 13 is applied. By varying the amount of prestress applied to the precoiled spring the free length of the hose may be varied as well as its flexibility. The method of tight coiling wire is known in the art and need not be described herein.

The sheath 13 may be applied to the wire 12 in any desired manner known in the art, for example, by the method disclosed in my co-pending application Serial No. 415,255, filed March 10, 1954.

It is not essential that the composite reinforcing element 11 be bonded or adhered to the tube 10 since it will be effectively trapped in the deep spiral corrugation 14 formed in the tube 10. Additionally, since both the tube 10 and the sheath or coating 13 are made of thermoplastic material, sufficient frictional resistance will be present to prevent displacement of the element 11 from the corrugations in the tube 10.

The apparatus of Figs. 2 to 6, inclusive, may be used in assembling the hose of Fig. 1.

Figure 2:
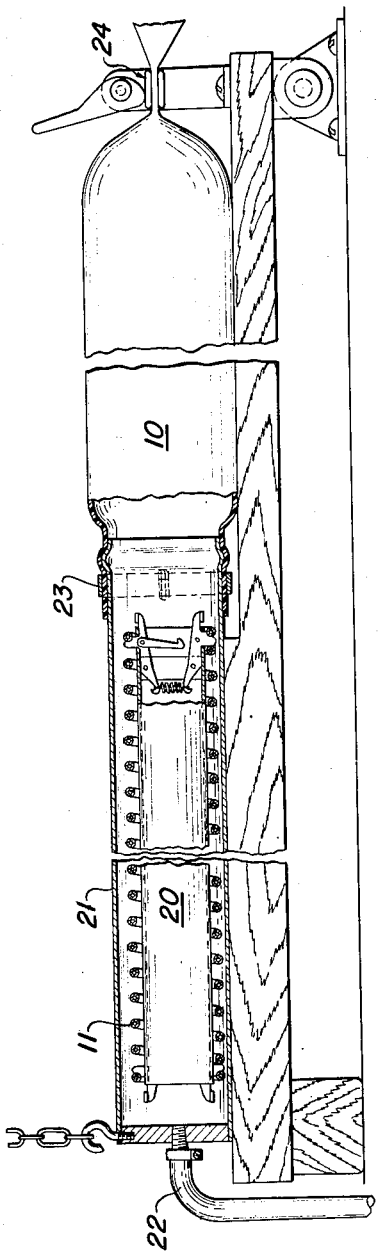

The precoiled composite reinforcing element 11 prestressed so that its convolutions press against each other, is placed on a mandrel 20 of smaller diameter than the coil 11 and stretched lengthwise to the position shown in Fig. 2 which separates the coils a substantial distance apart. The coil is stretched from 2 to 4 times its original length, and suitable clamps are provided at the ends of mandrel 20 to hold the coil 11 in extended position.

The mandrel 20 with the extended coil 11 thereon is then placed in a rigid pipe 21 having an air hose 22 leading to its interior. The open end of a length of tubing 10 is clamped to the open end of the pipe 21 by means of clamp 23, the opposite end of the tube being closed by clamp 24 as shown in Fig. 2. Air under pressure is then applied to the hose 22 to inflate the tube 10 and the pipe 21 tilted as shown in Fig. 3 so that the mandrel 20 with coil 11 thereon slides into the expanded section of tube 10 as shown in Fig. 3.

The air pressure is then released and the tube severed at the clamp 24 whereby the tube 10 and coil 11 will assume the position shown in Fig. 4. The inside diameter of the tube 10 being less than the inside diameter of the coil 11 and the coil being stretched, the tube and coil will take the position shown with the wall of the tube tending to enter between the turns of the coil. In the position shown in Fig. 4 the coil 11 is still in extended position being held extended by the wall of tube 10.

If it is desired to bond the composite coil 11 to the tube 10, a suitable solvent is placed in the interior of the tube 10 and the latter rotated to distribute the solvent while warm air is supplied by pipe 25 to evaporate any excess solvent. As previously stated, it is not essential that the coil 11 be bonded to the tube 10.

Figure 5:
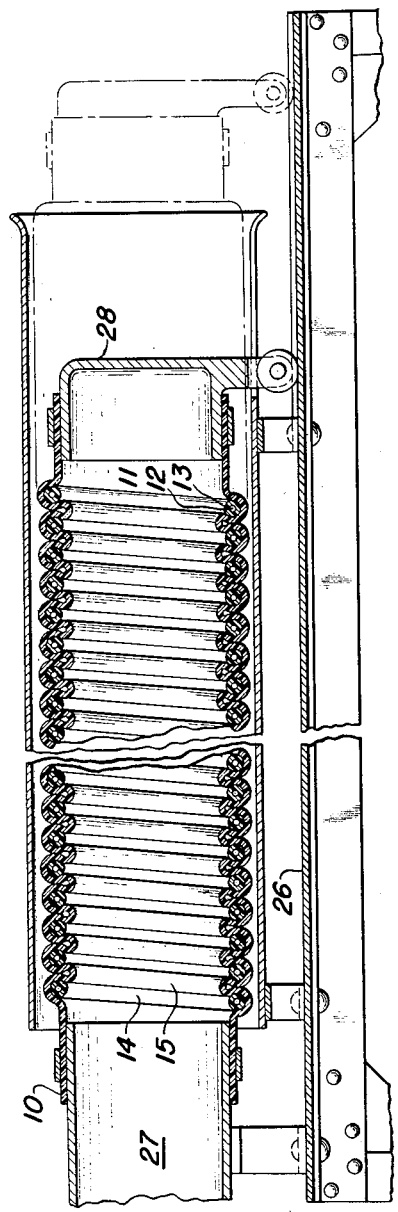
Fig. 5 shows one apparatus and method by which the hose of Fig. 1 may be deeply corrugated.

The tube 10 and the encased coil 11 may then be placed in an apparatus 26 shown in Fig. 5, one end of the tube 10 being clamped to a suction pipe 27, the other to a movable carriage 28 and suction applied while the tube and coil is being heated to a temperature of about 180° F. The suction will permit the hose 10 and coil 11 to collapse to the position shown in Fig. 1 and the heat applied will soften the tube to a semiplastic state and relax the tension therein and the parts will maintain their collapsed position. If a solvent was previously applied, the coil 11 will be bonded to the tube 10 in the spiral valley 14. If no solvent was applied, the convolutions of the coil 11 will be effectively trapped in the deep valley or corrugation 14.

While the hose is still warm, it may be stretched to break any adhesions which may have occurred between adjacent corrugations. After the hose cools it will take a permanent set in the position shown in Fig. 1.

Figure 6:
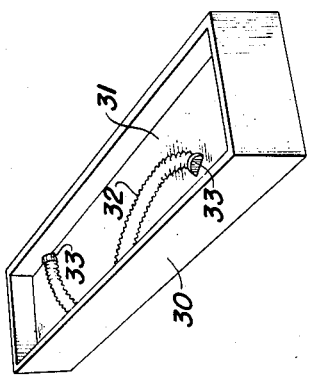
Fig. 6 shows another apparatus by which deep corrugations may be formed in the hose wall.

The apparatus of Fig. 6 may also be used to cure the hose carcass 32 as it appears in Fig. 4. The tank 30 is partially filled with water 31 maintained at a temperature of from 150° to 180° F. by a suitable heating element (not shown). The hose carcass 32 as it appears in Fig. 4 is then immersed in the warm water 31 in the tank 30. If a steel wire is used, plugs 33 may be applied to the ends of the carcass to prevent water from entering its interior. If aluminum wire is used, plugs 33 should be omitted to permit the carcass 32 to sink, in which case the interior of the hose will have to be dried after curing.

It has been found in practice that the hose need only be immersed for a few seconds by the above method, although the immersing time is not critical so long as the water temperature is maintained between the above limits.

The carcass 32 as shown in Fig. 4 is under three types of stresses. First, since the unstretched inside diameter of the tube 10 is less than the outside diameter of the coil 11, its walls will tend to draw inwardly between the convolutions or turns of coil 11 as shown in Fig. 4. Second, the coil 11 being stretched at least to four times its original length, its coils will tend to return to their original closely coiled position. Third, when the tube was originally extruded stresses were set up in its wall tending to shorten it lengthwise and to reduce its periphery.

As soon as the carcass 32 is placed in the warm water 31, the material of the tube 10 will soften in a few seconds and the stresses on the wall of the tube 10 will be relaxed and the wall will move inwardly under the stress applied by the spring to form the deep corrugations 15 without the application of any external force whatsoever. It has been found that positively holding the carcass in collapsed position prior to heating is actually deleterious, in that, minute cracks may be formed in the vinyl tubing.

The length of the tubing used per coil of spring, while not exactly critical, is important. It has been found in practice that from 168 to 170 inches of tubing to 512 coils of spring is suitable to form a hose which will not produce a whistling sound in use and in which the coils will not become displaced by flexing or stretching the hose.

The amount the coil 11 is extended in making a hose according to the process of the present invention determines the length of tubing 10 which is used and also the depth of the folds 15 which will be formed in the finished hose. It will therefore also determine the extent to which the finished hose may be extended. Thus, by varying the amount of stretch applied to the coil 11 the extensibility of the finished hose may be varied.

The tube wall is formed with deep corrugations in which the turns of the composite reinforcing element are effectively trapped, the turns being separated only by the walls of the tube which form the corrugations or folds.

The finished hose is readily extensible, since it is only necessary that the corrugations or folds of the tube be straightened out in order to extend the finished hose, there being no necessity for placing the wall of the hose under tensile stress as in previous constructions.

The composite reinforcing element is effectively trapped in the corrugations of the tube 10, whether or not the former is bonded to the latter because the frictional resistance between the coil 11 and the tube 10 will prevent displacement of the coils of coil element 11 from their proper corrugation.

While the diameter of the coil, the diameter and thickness of the tube, the length of the unstretched coil and the length of the tube may vary widely for making hose of different sizes and for different purposes, the following has been found very satisfactory for making suction cleaner hose according to the present invention. The coil 11 may have an inside diameter of 1⅝ inches and the tube 10 an original inside diameter of 1¼ inches and a thickness of 0.22 inch. A coil having an unstretched length of 39 to 40 inches may be used with a tube 170 inches long.

By using parts having the foregoing dimensions and the method of the present invention a hose having the following characteristics may be formed. When the carcass is removed from the mandrel 20 it will contract from 170 inches to approximately 100 inches. After it is heat treated it will contact to approximately 77 inches if no compressing force is applied. When a compressing force is applied it will contract to approximately 62 inches. Such a hose, by the application of a 6-pound axial pull can be stretched to 165 inches or 13¾ feet and when the force is released it will return to a free length of 77 inches and can be returned to a length of 62 inches for storage.

While I have shown and described but two embodiments of my invention, it is to be understood that those embodiments are to be taken as illustrative only and not in a limiting sense. I do not wish to be limited to the particular structure and methods shown and described but wish to include all equivalent variations thereof, except as limited by the scope of the claims.

I claim:

1. The method of making a flexible hose comprising, coiling a reinforcing element into a closely wound cylindrical coil with the turns thereof in contact with each other, extending said coil axially so that the turns thereof are substantially spaced from each other and under a stress tending to return into contact with each other, inflating a thin-walled thermoplastic tube having an internal diameter less than that of said coil, placing said inflated tube over said coil while the latter is in its extended position, deflating said tube to permit its walls to embrace said coil and hold the turns thereof in their spaced relationship, heating the assembly sufficiently to soften said tube, collapsing said coil and tube axially to permit the turns of said coil to approach each other under their tendency to return into contact with each other with the wall of said tube lying in deep folds between the turns of said coil and lowering the temperature of the assembly to cause said tube to take a permanent set in its deeply folded position.

2. The method as defined in claim 1 in which said collapsing step is carried out while heat is being applied to said tube.

3. The method as defined in claim 2 in which the heat is applied to said tube by immersing the assembly in warm water to soften the wall of said tube and cause the assembly to take its collapsed position under the inherent tendency of said coil to return to its closely coiled position.

4. The method as defined in claim 1 in which said collapsing step comprises applying a suction to the interior of the assembly while heat is being applied thereto.

5. The method as defined in claim 1 in which inwardly and outwardly extending spiral folds are formed in the wall of said tube during the collapsing step, in which the turns of said coil are embraced within the outwardly extending spiral fold and the walls of the inwardly extending spiral fold lie between and in substantial contact with adjacent turns of said coil.

6. The method as defined in claim 5 in which the inner periphery of the inwardly extending spiral fold extends inwardly of the inner periphery of the turns of said coil.

7. The method of making a flexible hose comprising, coiling a reinforcing element into a closely wound cylindrical coil with the turns thereof in contact with each other, extending said coil axially so that the turns thereof are substantially spaced from each other, inflating a thin-walled thermoplastic tube having an internal diameter less than that of said coil, placing said inflated tube over said coil while the latter is in its extended position, deflating said tube to permit the wall thereof to contract about the extended coil to hold the turns thereof in their spaced relationship, releasing said coil to permit the turns thereof to tend to return to their original closely wound position and to permit the wall of said tube to tend to move inwardly between the turns of said coil, applying heat to said tube to soften the wall of said tube to permit the turns of said coil to move toward each other with the wall of said tube lying in deep folds between and in contact with the turns of said coil, and reducing the temperature of the assembly to cause the wall of said tube to take a permanent set in its deeply folded position.

8. The method as defined in claim 7 in which the heat applying step comprises immersing the assembly in a bath of warm water.

9. The method as defined in claim 7 in which said reinforcing element consists of a reinforcing wire sheathed in a thin covering of thermoplastic material.

10. The method of making an extensible and flexible hose comprising, axially stressing a cylindrical spirally coiled reinforcing element so that the turns thereof are spaced apart and stressed so as to tend to contract toward each other when free to do so, expanding a thin-walled thermoplastic tube having an inside diameter less than that of said coil, assembling said expanded tube over said stretched coil, releasing said tube to permit it to closely embrace the turns of said coil, releasing said coil to permit its turns to tend to move toward each other, applying heat to the assembly thus formed to soften the wall of said tube to permit the turns of said coil to move toward each other and to permit the wall of said tube to move inwardly in a spiral fold lying between and in contact with adjacent turns of said coil with the turns of said coil lying within the outwardly extending apex of the fold and reducing the temperature of the assembly to cause the wall of said tube to take a permanent set in its folded condition.

11. The method according to claim 10 in which said heating step comprises immersing the assembly in a bath of warm water.

12. The method according to claim 10 in which a suction is applied to the interior of the assembly during the heating step.

13. The method of assembling a thermoplastic tube to a stretched spiral cylindrical reinforcing element comprising, placing said tube over said element and applying a suction to the interior of said tube while the latter is at an elevated temperature such that it is in a semiplastic state to cause the wall of said tube to move inwardly between the turns of said reinforcing element.

14. The method according to claim 13 including the step of simultaneously bonding the turns of said reinforcing element to said tube.

15. The method according to claim 13 in which said reinforcing element is axially extended prior to the assembly of said tube thereover so that the turns thereof tend to move towards each other.

References Cited in the file of this patent

UNITED STATES PATENTS

| | | |
|---|---|---|
| 2,272,704 | Harding | Feb. 10, 1942 |
| 2,560,369 | Roberts | July 10, 1951 |
| 2,641,302 | Martin et al. | July 9, 1953 |

FOREIGN PATENTS

| | | |
|---|---|---|
| 651,097 | Great Britain | Mar. 14, 1951 |